United States Patent Office 3,530,038
Patented Sept. 22, 1970

3,530,038
PROCESS FOR PREPARATION OF
TRIHYDROXY STEROIDS
Jan de Flines and Willem Frederik van der Waard, Delft,
Netherlands, assignors to Koninklijke Nederlandsche
Gist- en Spiritusfabriek N.V., Delft, Netherlands, a
corporation of the Netherlands
No Drawing. Filed Apr. 24, 1967, Ser. No. 632,944
Claims priority, application Netherlands, Apr. 25, 1966,
6605514
Int. Cl. C07c *167/08*
U.S. Cl. 195—51                                    12 Claims

ABSTRACT OF THE DISCLOSURE $11\beta,17\alpha,21$-trihydroxy steroids are prepared by oxygenating corresponding 11 desoxy, $17\alpha$ acyloxy, 21 acyloxy steroid or 11 desoxy, $17\alpha$ acyloxy, steroid, with Curvularia.

PRIOR ART

U.S. Pat. No. 2,658,023 discloses the oxygenation of 11-desoxy-$17\alpha$-hydroxy-steroids with fungi of the genus Curvularia, particularly *Curvularia lunata*. This process is particularly important for the preparation of hydrocortisone($\Delta^4$-pregnene-$11\beta,17\alpha,21$ - tryol - 3,20-dione) from $\Delta^4$-pregene-$17\alpha,21$-diol-3,20-dione.

In the $11\beta$-hydroxylation with the aid of fungi of the genus Curvularia as well as with that of other fungi (cf., literature cited in U.S. Pat. No. 2,658,023) undesirable by-products are formed. Thus, as appears from U.S. Pat. No. 2,783,255, upon application of Curvularia enzymes, products are obtained also hydroxylated in positions 7 and/or $14\alpha$. It is difficult to remove these by-products from the final product, while the formation of these by-products involves the loss of costly starting product and a corresponding reduction of the yield of the desired product.

OBJECTS OF THE INVENTION

It is an object of the invention to provide a novel process for the preparation of $11\beta,17\alpha$-21-trihydroxy steroids in high yields.

It is another object of the invention to provide a process for $11\beta$-hydroxylation of $17\alpha$-OR-21-OR'-11-desoxy steroids.

These and other objects and advantages of the invention will become obvious from the following detailed description.

THE INVENTION

The novel process of the invention for the preparation of $11\beta,17\alpha$-21-trihydroxy steroids comprising subjecting an 11-desoxy-$17\alpha$-OR'-21-OR' steroid, in which R is an organic carboxylic acid radical of 1–18 carbon atoms and R' is selected from the grouping of hydrogen and an acyl of an organic carboxylic acid of 1–18 carbon atoms to oxidation by enzymes from fungi of the genus Curvularia to form the corresponding $11\beta$-hydroxy steroid. Sometimes, it is necessary to saponify the said product to free the $17\alpha$-hydroxy group. It is unexpected that the yields of the oxygenation process of the invention in which the starting steroid has a $17\alpha$-OR grouping are much higher than the yields obtained when the starting steroid has a $17\alpha$-hydroxy group.

While U.S. Pat. No. 2,658,023 states in column 3, lines 62–67 that in conversions with enzymes from Curvularia species instead of steroids with a free hydroxyl group use may also be made of esters of those steroids as starting materials, this passage cannot concern $17\alpha$-esters, because it is observed in this connection in U.S. Pat. No. 2,658,023 that if the esters are used, a considerable reduction of the yield of the hydroxylated products will sometimes occur. For the rest, it was found by applicants that the use of $17\alpha$-hydroxy-21-acyloxy compounds as starting products does not involve a reduction of the yield, but only a retardation of the reaction. The microbiological/enzymatic conversion of 21-acetoxy-$\Delta^4$-pregnene$17\alpha$-ol-3,20-dione proceeds more slowly than that of $\Delta^4$-pregnene-$17\alpha,21$-diol-3,20 dione, while hydrocortisone is obtained therefrom in the same low yields of about 40%. According to the present invention, however, a particularly striking improvement of the yield is achieved. Thus, $17\alpha$-acetoxy-$\Delta^4$-pregnene-21-ol-3,20-dione is rapidly converted in a yield of about 96% of theory into hydrocortisone or a mixture of hydrocortisone and the $17\alpha$-acetate of hydrocortisone.

If $17\alpha$-esters are used as starting materials in the present conversion, first, a $17\alpha$-acyloxy-$11\beta$-hydroxy compound is obtained, which is subsequently converted completely or partially during the incubation into an $11\beta,17\alpha$-dihydroxy steroid. The free alcohols can be obtained from the non-saponified $17\alpha$-esters in high yield by chemical means, e.g., by reaction with sodium methanolate.

The only requirements to be satisfied by the steroid to be used as the starting materials are the presence of a $17\alpha$-hydroxy group in which the hydrogen atom has been replaced by an organic radical which must be present and the presence of two hydrogen atoms in the 11-position. The starting steroids may be members of the pregnane, the androstane or the estrane series. They may be substituted in the usual way and may also contain double bonds. Thus, in the $17\beta$-position, besides the $17\alpha$-esterified or etherified hydroxyl group, an alkyl, alkenyl, or alkenyl group or a 1-hydroxyethyl, 1,2-di-hydroxyethyl, acetyl, or hydroxyacetyl group may be present. The presence of hydroxyl groups which may or may not be esterified or etherified or of oxo groups in other positions in the molecule, such as position 3 or 16, does not interfere with the present conversion. Alkyl groups may also be present in positions such as 2, 4, 6 and/or 16, or halogen atoms may be present, such as in position 4, 6, 7, 9, 12 or 21. Also double bonds may be present provided the 11 carbon atom carries two hydrogen atoms. The starting products may also contain a condensed heterocyclic ring, e.g., at carbon atoms 2 and 3. Finally, the starting products may also be 18- and/or 19-nor compounds.

The $17\alpha$-OR groups of the starting materials is preferably an ester since ester groups can be removed again most readily but it may also be an ether. Examples of suitable organic carboxylic acids for the formation of the esters are those of 1 to 18 carbon atoms.

Examples of suitable organic acids of 1 to 18 carbon atoms may be derived from an aliphatic, aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, $\beta$-trimethyl propionic acid, heptanoic acid, caprylic acid, pelarginic acid, capric acid, undecylic acid, lauric acid, myristic acid, palmitic acid and stearic acid; alkenoic acids, such as undecylenic acid and oleic acid; cycloalkyl carboxylic acids, such as cyclopentyl carboxylic acid, cyclopropyl carboxylic acid, cyclobutyl carboxylic acid and cyclohexyl carboxylic acid; cycloalkyl alkanoic acids, such as cyclopentyl acetic acid, cyclohexyl acetic acid, cyclopentyl propionic acid and cyclohexyl propionic acid; arylalkanoic acids, such as phenyl acetic acid and phenyl propionic acid; aryl carboxylic acids, such as benzoic acid and 2,4-dinitrobenzoic acid; phenoxy alkanoic acids, such as phenoxy acetic acid, p-chlorophenoxy acetic acid, 2,4-dichlorophenoxy acetic acid, 4-terbutylphenoxy acetic acid, 3-phenoxy propionic acid and 4- phenoxy butyric acid; heterocyclic carboxylic acids, such as furane-2-carboxylic acid, 5-terbutylfurane-2-carboxylic acid, 5-bromo-furane-2-carboxylic acid and nicotinic acids; $\beta$-ketoalkanoic acids, such as acetylacetic acid, propionylacetic acid and butyrylacetic acid; amino acids, such as diethylaminoacetic acid and aspartic acid.

Examples of suitable ethers are alkyl ethers of 1 to 10 carbon atoms such as methylether, ethyl ether, butyl ether, aromatic ethers such as trityl ethers, cycloaliphatic ethers and heterocyclic ethers such as tetrahydropyranyl ether.

If the starting steroid contains other hydroxyl groups besides that in the 17$\alpha$-position, these may also be esterified or etherified. The yield of the 11$\beta$-hydroxylation product is not affected by this. On the other hand, the hydroxylation rate may depend upon the substituents present. Thus, the 11$\beta$-hydroxylation of 17$\alpha$,21-diacyloxy steroids proceeds more slowly than that of the corresponding 17$\alpha$-acyloxy-21-hydroxy steroids, although with the diacyloxy compounds the same high yield is obtained.

The starting products may be obtained by conventional methods, such as acylation of the corresponding 17$\alpha$-hydroxy steroids in the presence of acid catalysts, such as para-toluene sulfonic acid or perchloric acid. Thus, the 17$\alpha$,21-diacetate of $\Delta^4$-pregnene-17$\alpha$,21-diol-3,20-dione can be obtained according to R. B. Turner (J. Am. Chem. Soc. 75 (1953) 3489) by reaction with acetic anhydride in acetic acid in the presence of para-toluene sulfonic acid as catalyst. In the case of steroids with a dihydroxy-acetone side-chain, such as $\Delta^4$-pregnene-17$\alpha$, 21-diol-3,20-dione, the 17$\alpha$-mono-esters can also be prepared with advantage via the ortho-esters, as has been described by R. Gardi et al. (Gazzetta chimica italiana 93 (1963) 431–450).

Examples of Curvularia species to be used are the species *Curvularia falcata, C. brachyspora, C. lunata,* and *C. pallescens* mentioned in U.S. Pat. No. 2,658,023, or other Curvularia species, such as *Curvularia geniculata* Tracy et Earle (Boedijn).

For the microbiological conversion, the Curvularia fungus must be grown in a suitable culture medium, which contains in particular carbohydrates, salts, and organic or inorganic nitrogen. Other useful substances are growth promoters, such as vitamins of the B-complex. Glucose or saccharose can be used advantageously as a source of carbon. Further, corn steep liquor and/or soybean grit may be used as nitrogen sources, corn steep liquor being preferable because of the growth promoters present therein.

The starting steroid is added to the culture in the form of a crystal suspension or dissolved in a suitable solvent, such as acetone, propylene glycol, or dimethyl formamide, after which the aeration of the culture is continued in order to promote the growth of the micro-organism and the oxygenation of the steroid. In some cases, it is advantageous to add the steroid after the micro-organism has already been grown under aerobic conditions. It is also possible to isolate the micro-organism from the culture medium after cultivation and to suspend it again in distilled water or a physiological salt solution, in which the steroid to be oxygenated is present or to which it is added. Instead of the mycelium, it is also possible to use spores of the micro-organism or an enzyme preparation of the organism (cf., Zuidweg et al. (Biochim. Biophys. Acta 58 (1962) 131)). Dependent upon the nature and the concentration of the steroid or the Curvularia species used, conversion times of 10–90 hours may be used, while the fermentation temperature may vary from 20° to 37° C. As a rule, the steroid is used in a concentration of no more than 10 grams per litre, dependent upon the conversion rate of the steroid under the given circumstances.

After the completion of the oxygenation, the reaction product can be obtained from the filtered or centrifuged culture liquid and, if necessary, from the mycelium by extraction with a suitable solvent not completely miscible with water. As such, methylene chloride, ethylene chloride, or methyl isobutyl ketone is preferably used. The extract can be evaporated to a small volume or be evaporated completely to dryness.

The crystalline or non-crystalline residue is subsequently converted, if necessary, by chemical means into the desired 17$\alpha$-hydroxy steroid. Thus, the 17$\alpha$-esters of 11$\beta$-hydroxy steroids can be converted into the 11$\beta$,17$\alpha$-dihydroxy compounds by removal of the acyl group with the aid of a sodium alcoholate in an alkanol, such as methanol or ethanol. Other corresponding derivatives can be converted by conventional methods into the desired compounds in question. Through simple crystallization, the final products can finally be isolated in purified condition.

In the following examples there are described several preferred embodiments to illustrate the invention. However, it should be understood that the invention is not intended to be limited to the specific embodiments.

EXAMPLE I

Preparation of hydrocortisone

To prepare the inoculation material, the contents of two Erlenmeyer flasks with a capacity of 2000 cm.$^3$, each of which contained 500 cm.$^3$ of the culture medium, was inoculated with a culture of *Curvularia lunata* grown on oatmeal agar. The medium consisted of a solution of 20 g. of corn steep liquor (calculated on dry substance) and 20 g. of glucose per litre of water, which, after the pH had been adjusted to 6.5 with 2 N sodium hydroxide solution, had been sterilized for 20 minutes at 120° C. The flasks were subsequently shaken for 48 hours at 26° C. on a rotary shaking machine (250 r.p.m.). The contents of an inoculation vessel with a net capacity of 80 litres was inoculated with 1000 ml. of the inoculation culture obtained. This inoculation vessel was equipped with an aeration device and contained a culture medium consisting of a solution of 5 g. of corn steep liquor (calculated on dry substance) and 5 g. of glucose per litre of water, which, after the pH had been adjusted to 6.5 with sodium hydroxide, had been sterilized for 30 minutes at 120° C. The culture thus obtained was aerated for 30 hours at 26° C. with an air velocity near the blower of 0.5 m./min., and then the contents of a main fermentation vessel was inoculated therewith.

The main fermentation was carried out in a fermentation tank with a net capacity of 800 litres. The culture medium for the main fermentation consisted of a solution of 40 g. of corn steep liquor (calculated on dry substance) and 8 g. of glucose per litre of water, which, after the pH had been adjusted to 6.5 with sodium hydroxide, had been sterilzed for 30 minutes at 120° C. The main culture was aerated with an air velocity near the blower of 0.5 m./min. and stirred with a standard Rushton turbine stirring mechanism with a tip velocity of 250 cm./sec. at a temperature of 26° C. The inoculation percentage was 10%. Ten hours after the inoculation, 400 g. of 17$\alpha$-acetoxy-$\Delta^4$-pregnene-21-ol-3,20-dione was added in the form of a fine suspension in water. According to a paper chromatographic test, all the starting material was found 12 hours after addition of the steroid to have been converted into a mixture of practically exclusively hydrocortisone and hydrocortisone 17$\alpha$-acetate. After the mycelium had been filtered off, it was thoroughly washed with methyl isobutyl ketone. The wash liquors were used, in combination with fresh solvent, to extract the culture filtrate three times in succession with 0.2 vol. of solvent. The combined extracts were concentrated under reduced pressure to 600 ml. After being dried, the crystallized product weighed 276 g. and consisted of hydrocortisone and hydrocortisone 17$\alpha$-acetate with a small amount of impurities.

The mother liquor was diluted with methyl isobutyl ketone to 3600 ml., washed in cold condition with 360 ml. of sodium hydroxide, and subsequently washed with water until the reaction is neutral. After this, the organic layer was evaporated to dryness under reduced pressure. The residue was taken up in 1200 ml. of methanol and the oil layer thus separated was isolated and extracted twice with half the volume of methanol. 9600 ml. of methanol was further added to the combined methanolic solutions, after which the 276 g. of crystals of hydrocortisone and hydrocortisone 17α-acetate were dissolved in the solution. After saturation with nitrogen, 220 cm.$^3$ of a nitrogen-saturated 1 N solution of sodium methylate in methanol was added at room temperature. After 1 hour's stirring under nitrogen, the solution was neutralized with acetic acid, and, after dissolution of the crystallized hydrocortisone by heating, 40 g. of active carbon were added. After filtration, the filtrate was concentrated to 1100 ml. After 12 hours at 3° C., the hydrocortisone was filtered off, washed with methanol and water, and dried for 16 hours at 80° C. while passing through air to obtain 275.4 g. of hydrocortisone [melting point 216–219° C.; $[\alpha]_D = +151°$ (c.=1 in dioxan); $E_{1\ cm.}^{1\%}$ at 242 mμ in methanol=443]. From the mother liquor further 55.2 g. of hydrocortisone were isolated by crystallization whereby the yield was increased to 88.6%.

The crude crystallisate can be used for the preparation of pure hydrocortisone 17α-acetate. For this purpose, 200 g. of the crude crystals were dissolved in 100 ml. of methanol by heating, after which the solution was acidified with 8.6 cm.$^3$ of acetic acid and decolorized with 20 g. of active carbon. To the filtrate, 680 ml. of water were added after which the solution was cooled. The crystallized product was filtered off, washed with 60% methanol, and dried. Then the product was crystallized once again with 60% methanol, and then from 200 ml. of methyl isobutyl ketone to obtain 64.1 g. of pure hydrocortisone 17α-acetate having a melting point of 232–234° C. and a specific rotation of $[\alpha]_D = +52°$ (c.=1% in dioxan; $E_{1\ cm.}^{1\%}$ at 241.5 mμ in methanol=414.

Elemental analysis.—Calculated: C, 68.29%; H, 7.97%. Found: C, 68.21%; H, 7.89%.

Infra-red spectrum: bands at 3620, 3508, 1735, 1714, 1669, 1620 and 1082 cm.$^{-1}$.

NMR spectrum: Maxima at 0.96, 1.47, 2.85, 3.28, 4.28, 4.50, and 5.74 p.p.m. (with respect to tetramethylsilane as standard)

The 17α-acetoxy-Δ$^4$-pregnene-21-ol,3,20-dione used as starting product was prepared via the 17,21-orthoester, as described by R. Gardi et al. in Gazz. chim. ital. 93 (1963) 431–450.

EXAMPLE II

In the same way as described in Example I, a main fermentation broth was prepared, the culture medium which consisted of 7 g. of corn steep liquor (calculated on dry substance), 7 g. of glucose, and 3 g. of soybean meal per litre of tap water. The culture was allowed to grow for 10 hours, after which a suspension of 17α,21-diacetoxy-Δ$^4$-pregnene-3,20-dione in water was added to a concentration of 500 mg. per litre. After 36 hours' incubation at 29° C. the substratum had been completely converted into practically exclusively hydrocortisone and hydrocortisone 17α-acetate. The reaction product was worked up in the same way as described in Example I to obtain pure hydrocortisone in a yield of 87.4%.

EXAMPLE III

An inoculation material of *Curvularia lunata* was prepared as in Example I and was used to prepare a main fermentation broth (inoculation percentage of 5%) in 10 Erlenmeyer shaking flasks of 2000 cc. capacity, each of which contained 500 cc. of a culture medium consisting of a solution of 5 g. of corn steep liquor (calculated on dry substance) and 5 g. of glucose per litre of water, which, after the pH had been adjusted to 6.8 with sodium hydroxide solution, had been sterilized. The flasks were shaken at 26° C. on a rotary shaking machine (250 r.p.m.). After 18 hours' growth, 5 cm.$^3$ of a suspension of 250 mg. of 17α-propionyloxy-Δ$^4$-pregnene-21-ol-3,20-dione was added to each of the flasks. The cultures were then incubated for 24 hours under the above conditions, the pH value being maintained at about 6. From paper chromatograms, it was determined that the sub-stratum had been completely converted into hydrocortisone 17α-propionate and a small amount of hydrocortisone. The cultures were extracted without filtration with an equal volume of methyl isobutyl ketone. The extract was concentrated under reduced pressure to about 1 litre, and washed with 100 cm.$^3$ of 0.1 N sodium hydroxide solution and 3×100 cm.$^3$ of distilled water. The washed extract was treated with active carbon and then evaporated to dryness under reduced pressure. Except for a small amount of insoluble material, the residue was dissolved in 50 cm.$^3$ of methanol. Methanol was added to this solution until the volume was 250 cm.$^3$ and the solution was saturated with nitrogen. Then 25 cm.$^3$ of a 0.1 N solution of sodium methylate in methanol, previously saturated with nitrogen, were added thereto.

The solution was stirred for 1 hour at room temperature under nitrogen and then neutralized with 3 cm.$^3$ of N acetic acid. From paper chromatograms, it was determined that the solution contained hydrocortisone and a small quantity of impurities. The solution was evaporated under reduced pressure to a crystalline residue. This residue was crystallized from 10 cm.$^3$ of dichloroethane. A quantity of 1.8 g. of crystalline product was obtained, which according to paper chromatograms, consisted of hydrocortisone with a small amount of polar impurities. This product was recrystallized from about 5 cm.$^3$ of methanol to yield 1.57 g. of practically pure hydrocortisone (70% of the theory). The infra-red spectrum of the substance was identical with that of hydrocortisone.

The 17α-propionate of Δ$^4$-pregnene-17α,21-diol-3,20-dione used as starting material was prepared by the method of Gardi et al., loc. cit.

This substance had the following constants: Melting point: 126–129° C.; $[\alpha]_D = 40°$ (c.=1%, in chloroform).

Analysis.—Calculated: C, 71.61%; H, 8.51%. Found: C, 71.63%; H, 8.44%.

I.R. spectrum: bands at 3500, 1732, 1713, 1655 and 1617 cm.$^{-1}$.

N.M.R. spectrum: Maxima at 0.70, 1.20, 1.13 (triplet), 2.30 (quadruplet), 3.18 (triplet), 4.25 (doublet), 5.74 p.p.m.

EXAMPLE IV

An inoculation material of *Curvularia lunata* was prepared as described in Example I, and used for the preparation of a main fermentation broth in shaking Erlenmeyers of 500 cm.$^3$, containing 100 cm.$^3$ of culture medium composed as described in Example III (inoculation percentage of 5%). After inoculation, the flasks were shaken under the conditions mentioned in said example. After 18 hours' growth, 1 cm.$^3$ of a suspension containing 25 mg. of 17α,21-dipropionyloxy-Δ$^4$-pregnene-3,20-dione in water was added to each of the shaking flasks. The pH of the cultures was then adjusted to different values and then the cultures were incubated for a further 48 hours under the above conditions.

The conversion was checked by extracting a culture with methyl isobutyl ketone after different times and determining the composition of the extracts by paper chromatography and thin-layer chromatography, combined with saponification (with alcoholic metal alkali hydroxide solution under nitrogen) of the esters formed. At pH 7.5 to 8.5, the sub-stratum appeared to be completely converted in 48 hours into hydrocortisone (via 17α-propionyloxy - Δ$^4$-pregnene-21-ol-3,20-dione and hydrocortisone 17α-propionate) with traces of polar material. At a pH lower than 7.5, hydrocortisone 17α-propionate was formed.

The said 17α,21-dipropionate used as a starting material was prepared by esterification of the 21-hydroxyl group of 17α-propionyloxy-Δ⁴-pregnene-21-ol-3,20-dione with propionic anhydride in pyridine.

The substance had the following constants: Melting point 166–167° C.; [α]_D=68° (c=1%, chloroform).

Analysis.—Calculated: C, 70.71%; H, 8.35%. Found: C, 70.95%; H, 8.28%.

I.R. spectrum: bands at 1738–1731, 1666, 1616 and 1165 cm.⁻¹. No OH-bands.

N.M.R. spectrum: Maxima at 0.78, 1.20, about 1.18 (triplet), 4.78 (doublet), 5.75 p.p.m.

EXAMPLE V

17α - benzoyloxy-Δ⁴-pregnene-21-ol-3,20 - dione was converted in the same way as in Example IV in shaking cultures of *Curvularia lunata,* and the conversion was also checked in the same way as in Example IV. After 48 hours the starting product has not been converted completely, viz., at a pH above 7 into exclusively hydrocortisone and at a pH below 4.5 into hydrocortisone 17α-benzoate.

The said 17α-benzoate used as starting material was prepared according to Gardi et al., loc. cit. The substance has the following physical constants. Melting point: 177–178°C.; [α]_D=2° (c=1% in chloroform).

Analysis.—Calculated: C, 74.64%; H, 7.61%. Found: C, 74.40%; H. 7.69%.

I.R. spectrum: bands at 3500, 1721, 1714, 1667, 1617, 1604, 1586, 1450, 1282 and 1090 cm.⁻¹.

N.M.R. spectrum: Maxima at 0.81, 1.20, 3.2, 4.3 (doublet), 5.7 and 7.5–8 p.p.m.

EXAMPLE VI

17α-phenylacetoxy-Δ⁴-pregnene-21-ol-3,20 - dione was converted in the same way as in Example IV in shaking cultures of *Curvularia geniculata,* and the conversion was also checked as in Example IV. In all cases the starting product was not converted quite completely in 48 hours, but exclusively into hydrocortisone.

The said 17α-phenyl acetate used as a starting material was prepared according to Gardi et al., loc. cit.

The substance had the following physical constants. Melting point: 205–207.5° C.; [α]_D=+49° (c=1, chloroform).

Analysis.—Calculated: C, 75.00%; H, 7.76%. Found: C, 75.08%; H, 7.73%.

I.R. spectrum: bands at 3500, 1730, 1715, 1668, 1615, 1495, and 1453 cm.⁻¹.

N.M.R. spectrum: Maxima at 0.64, 1.17, 3.63, 4.15, 5.76 and 7.3 p.p.m.

EXAMPLE VII

17α-cyclohexanecarboxylic acid ester of Δ⁴-pregnene-17α,21-diol-3,20-dione was converted in shaking cultures of *Curvularia lunata,* and the course of the conversion was checked in the way described in Example IV. In all cases the sub-stratum had been completely converted in 48 hours into the 17α-cyclohexanoic acid ester of hydrocortisone and a trace of hydrocortisone.

The starting material was prepared in the way described by Gardi et al., loc. cit. In the present case, the said product was obtained in an amorphous condition.

I.R. spectrum: bands at 3500, 1726, 1668 and 1617 cm.⁻¹.

EXAMPLE VIII

The process described in Example IV was repeated, but the starting product used was the 17α-capronate of Δ⁴-pregnene-17α,21-diol-3,20-dione. After 48 hours' incubation, the sub-stratum had been converted almost completely, viz., at a pH above 7 exclusively into hydrocortisone and at a pH below 6 into hydrocortisone 17α-capronate.

The starting material was prepared in the way described by Gardi et al., loc. cit. The substance had the following physical constants. Melting point: 100–105° C.; [α]_D=+39.6° (c=1 in chloroform).

I.R. spectrum: bands at 3500, 1730, 1668 and 1615 cm.⁻¹.

N.M.R. spectrum: Maxima at 0.70, 0.95, 1.20, 2.30, 4.28 (doublet) and 5.73 p.p.m.

EXAMPLE IX

Using the procedure of Example III, 10 shaking cultures of *Curvularia lunata* were prepared in Erlenmeyer flasks with a capacity of 2000 cm.³, each of which contained 500 ml. of culture medium. After 18 hours' shaking at 26° C., 5 cm.³ of an aqueous suspension containing 100 mg. of 17α-acetoxyprogesterone was added to each of the shaking flasks. The cultures were then incubated for 48 hours under the above conditions. As appeared from paper chromatography, the sub-stratum had been completely converted into substantially one product and a small amount of by-products not identified. The cultures were extracted with an equal volume of methyl isobutyl ketone. The extract was washed with dilute sodium hydroxide solution and water, then treated with active carbon, and subsequently evaporated to dryness under reduced pressure. The residue was crystallized from ethyl acetate to obtain a yield of 0.88 g. It appeared from paper chromatograms that this was 11β-hydroxy-17α-acetoxyprogesterone, with a very small amount of polar impurities. By renewed treatment with active carbon and recrystallization from methanol, 0.74 g. of pure 11β - hydroxy - 17α - acetoxyprogesterone were obtained, which had the following physical constants: Melting point: 257–259° C.

Analysis.—Calculated: C, 71.10%; H, 8.30%. Found: C, 71.02%; H, 8.16%.

I.R. spectrum: bands at 3620, 1732, 1718, 1666, 1620 and 865 cm.⁻¹.

N.M.R. spectrum: Maxima at 0.92, 1.46, 2.03, 2.08 and 5.70 p.p.m.

In order to confirm the structure, 250 mg. of the product were saponified by dissolution in 25 cm.³ of methanol and 25 cm.³ of a 4% solution of potassium hydroxide in methanol, the solution being allowed to stand for 15 hours at room temperature. The solution was neutralized with 1 cm.³ of glacial acetic acid and evaporated to dryness under reduced pressure. The residue was crystallized from 5 cm.³ of methanol and 5 cm.³ of water to obtain a yield of 203 mg. After recrystallization from a very small quantity of chloroform, 185 mg. of pure 11β,17α-dihydroxyprogesterone with a melting point of 222–224° C. were obtained. The infra-red spectrum of this product was identical with that of authentic 11β,17α-dihydroxyprogesterone. The mixed melting point shows no depression.

The 17α-acetoxyprogesterone used as starting material is described in J. Am. Chem. Soc. 75, 3489 (1953).

EXAMPLE X

The 17α-acetate of 6α-fluoro-16α-methyl-Δ⁴-pregnene-17α,21-diol-3,20-dione was converted in shaking cultures of *Curvularia lunata,* and the course of the conversion was checked in the way described in Example IV. In all cases, exclusively 6α-fluoro-16α-methyl-Δ⁴-pregnene-11β, 17α,21-triol-3,20-dione and its 17α-acetate were formed.

The 17α-acetate of 6α-fluoro-16α-methyl-Δ⁴-pregnene-17α,21-diol-3,20-dione had the following constants. Melting point: 188–190° C.

Analysis.—Calculated: C, 68.55%; H, 7.91%. Found: C, 68.41%; H, 7.89%.

EXAMPLE XI

The 17α,21-diacetate of 6α-fluoro-16α-methyl-Δ⁴-pregnene-17α,21-diol-3,20-dione was converted in shaking cultures of *Curvularia lunata,* and the course of the conversion was checked in the way described in Example IV. In all cases, exclusively 6α-fluoro-16α-methyl-Δ⁴-pregnene-11β,17α,21-triol-3,20-dione and its 17α-acetate were formed.

The starting 17α,21-diacetate of 6α-fluoro-16α-methyl-Δ⁴-pregnene-17α,21-diol-3,20-dione was obtained by the method described by R. B. Turner, J. Am. Chem. Soc. 75 (1953) 3489 and had the following physical constants. Melting point: 226.5–228.5° C.; $E_1$ $_{cm.}^{1\%}$ at 236 mμ in methanol=350.

Elemental analysis.—Calculated: C, 67.51%; H, 7.26%. Found: C, 67.54%; H, 7.53%.

I.R. spectrum: bands at 1735–1728, 1682, 1668, 1625 and 879 cm.⁻¹.

N.M.R. spectrum: Maxima at 0.81, 0.98 (doublet), 1.20, 2.14, 2.17, 4.78 and 6.08 p.p.m.

Various modifications of the process of the invention may be made without departing from the spirit or scope thereof.

We claim:

1. A process for the preparation of 11β,17α,21-trihydroxy steroids which comprises subjecting an 11-desoxy-17α-OR—21—OR′ steroid in which R is an acyl of an organic carboxylic acid of 1 to 18 carbon atoms and R′ is selected from the group consisting of hydrogen and an acyl of an organic carboxylic acid of 1 to 18 carbon atoms to oxidation by the enzymes from fungi of the genus Curvularia to form the corresponding 11β,17α,21-trihydroxy steroid and further converting any 11β-21-dihydroxy-17α-OR-steroid formed into the corresponding 11β,17α,21-trihydroxy steroid.

2. The process of claim 1 wherein OR is acetoxy.

3. The process of claim 1 wherein the 11-desoxy-17α-OR—21—OR′ steroid is 17α,21-diacetoxy-Δ⁴-pregnene-3,20-dione.

4. The process of claim 1 wherein the 11-desoxy-17α-OR—21—OR′ steroid is 17α-propionyloxy-Δ⁴-pregnene-21-ol-3,20-dione.

5. The process of claim 1 wherein the 11-desoxy-17α-OR—21—OR′ steroid is 17α,21-dipropionyloxy-Δ⁴-pregnene-3,20-dione.

6. The process of claim 1 wherein the 11-desoxy-17α-OR—21—OR′ steroid is 17α-benzoyl-Δ⁴-pregnene-21-ol-3,20-dione.

7. The process of claim 1 wherein the 11-desoxy-17α-OR—21—OR′ steroid is 17α-phenylacetoxy-Δ⁴-pregnene-21-ol-3,20-dione.

8. The process of claim 1 wherein the 11-desoxy 17α-OR—21—OR′ steroid is 17α-capronoyl-Δ⁴-pregnene-21-ol-3,20-dione.

9. The process of claim 1 wherein the 11-desoxy-17α-OR—21—OR′ steroid is 6α-fluoro-16α-methyl-17α-acetoxy-Δ⁴-pregnene-21-ol-3,20-dione.

10. The process of claim 1 wherein the 11-desoxy-17α-OR—21—OR′ steroid is 6α-fluoro-16α-methyl-17α,21-diacetoxy-Δ⁴-pregnene-3,20-dione.

11. The process of claim 1 wherein the fungus is *Curvularia lunata*.

12. A process for the preparation of hydrocortisone which comprises subjecting 17α-acetoxy-Δ⁴-pregnene-21-ol-3,20-dione to oxidation from *Curvularia lunata* to form hydrocortisone.

References Cited

UNITED STATES PATENTS

| | | | |
|---|---|---|---|
| 3,127,425 | 3/1964 | Reimann et al. | 195—51 |
| 3,131,200 | 4/1964 | Reimann et al. | 195—51 |
| 3,179,659 | 4/1965 | Bowers et al. | 195—51 |
| 3,312,692 | 4/1967 | Oliveto et al. | 195—51 |
| 3,359,287 | 12/1967 | Babcock et al. | 195—51 |

ALVIN E. TANENHOLTZ, Primary Examiner

U.S. Cl. X.R.

260—397.4, 397.45, 397.47